(12) United States Patent
Kim et al.

(10) Patent No.: US 10,996,832 B2
(45) Date of Patent: *May 4, 2021

(54) METHOD FOR DISPLAYING OBJECT ON DEVICE AND DEVICE THEREFOR

(71) Applicant: Samsung Electronics Co., Ltd., Suwon-si (KR)

(72) Inventors: Yo-han Kim, Suwon-si (KR); Bae-eun Jung, Seongnam-si (KR); Sum Hwang, Suwon-si (KR); Jae-jun Lee, Suwon-si (KR); Yu-sung Joo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/787,791

(22) Filed: Feb. 11, 2020

(65) Prior Publication Data

US 2020/0183570 A1     Jun. 11, 2020

Related U.S. Application Data

(63) Continuation of application No. 15/511,529, filed as application No. PCT/KR2015/009600 on Sep. 14, 2015, now Pat. No. 10,585,569.

(30) Foreign Application Priority Data

Sep. 15, 2014  (KR) ........................ 10-2014-0122031

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0486* (2013.01); *G06F 3/0488* (2013.01);
(Continued)

(58) Field of Classification Search
None
See application file for complete search history.

(56) References Cited

U.S. PATENT DOCUMENTS 7,810,042 B2    10/2010    Keely et al.
8,196,045 B2     6/2012    Chandratillake et al.
(Continued)

FOREIGN PATENT DOCUMENTS

CN     103348301 A     10/2013
CN     103970827 A      8/2014
(Continued)

OTHER PUBLICATIONS

European Office Action dated Apr. 16, 2019, issued in European Patent Application No. 15842894.6-1221.
(Continued)

*Primary Examiner* — Thanh T Vu
(74) *Attorney, Agent, or Firm* — Jefferson IP Law, LLP

(57) ABSTRACT

Provided is a method of displaying an object on a device, the method including detecting a thumbnail image of an object corresponding to a selected position on a progress bar providing search information regarding a plurality of objects that are displayed according to an order; obtaining a user input moved from the selected position to a size change area; and displaying the thumbnail image of the object, the thumbnail image having a size determined based on a position of the user input in the size change area.

17 Claims, 26 Drawing Sheets

(51) Int. Cl.
*G06F 3/14* (2006.01)
*G06F 3/0488* (2013.01)
*G06F 3/0486* (2013.01)
*G06F 3/0485* (2013.01)
*G06F 16/00* (2019.01)
*G11B 27/34* (2006.01)

(52) U.S. Cl.
CPC ...... *G06F 3/04845* (2013.01); *G06F 3/04855* (2013.01); *G06F 3/14* (2013.01); *G06F 16/00* (2019.01); *G11B 27/34* (2013.01)

(56) References Cited

U.S. PATENT DOCUMENTS

| | | | |
|---|---|---|---|
| 8,213,773 | B1 | 7/2012 | Cha et al. |
| 8,565,831 | B2 | 10/2013 | Chang et al. |
| 9,143,589 | B2* | 9/2015 | Lee ............... G11B 27/007 |
| 9,569,078 | B2 | 2/2017 | Cherna et al. |
| 9,569,533 | B2 | 2/2017 | Barsook et al. |
| 9,652,140 | B2 | 5/2017 | Song et al. |
| 9,671,825 | B2 | 6/2017 | Migos et al. |
| 9,715,482 | B1* | 7/2017 | Bjorkegren ......... G06F 40/103 |
| 10,620,796 | B2* | 4/2020 | Cueto ................. G06F 3/0488 |
| 2006/0294473 | A1 | 12/2006 | Keely et al. |
| 2007/0203942 | A1 | 8/2007 | Hua et al. |
| 2008/0168359 | A1 | 7/2008 | Flick et al. |
| 2009/0002335 | A1 | 1/2009 | Chaudhri |
| 2009/0158222 | A1 | 6/2009 | Kerr et al. |
| 2010/0039400 | A1 | 2/2010 | Jang |
| 2010/0042684 | A1 | 2/2010 | Broms et al. |
| 2010/0070523 | A1 | 3/2010 | Delgo et al. |
| 2010/0241961 | A1 | 9/2010 | Peterson et al. |
| 2012/0084647 | A1 | 4/2012 | Homma et al. |
| 2012/0192057 | A1 | 7/2012 | Migos et al. |
| 2012/0240074 | A1* | 9/2012 | Migos ................. G06F 3/04883 715/776 |
| 2013/0080881 | A1* | 3/2013 | Goodspeed ............ G06F 16/34 715/251 |
| 2013/0170753 | A1* | 7/2013 | Tanaka ................. G06F 16/785 382/190 |
| 2013/0239063 | A1 | 9/2013 | Ubillos et al. |
| 2013/0335455 | A1* | 12/2013 | Rooke ................. G06F 3/04855 345/684 |
| 2014/0118625 | A1 | 5/2014 | Cho |
| 2014/0195911 | A1* | 7/2014 | Cho ...................... G06F 3/0484 715/719 |
| 2014/0201637 | A1 | 7/2014 | Na et al. |

FOREIGN PATENT DOCUMENTS

| | | |
|---|---|---|
| EP | 2763017 A2 | 8/2014 |
| EP | 2889745 A1 | 7/2015 |
| KR | 10-2011-0122979 A | 11/2011 |
| KR | 10-2013-0129266 A | 11/2013 |
| KR | 10-2013-0136660 A | 12/2013 |
| KR | 10-2013-0140896 A | 12/2013 |
| KR | 10-2014-0091236 A | 7/2014 |
| WO | 2014/030679 A1 | 2/2014 |
| WO | 2014/123303 A1 | 8/2014 |

OTHER PUBLICATIONS

Chinese Office Action with English translation dated Nov. 18, 2019, issued in Chinese Patent Application No. 201580061945.7.
European Office Action dated Jun. 2, 2020, issued in European Patent Application No. 15842894.6-1203.
Korean Office Action dated Dec. 23, 2020, issued in Korean Application No. 10-2014-122031.

* cited by examiner

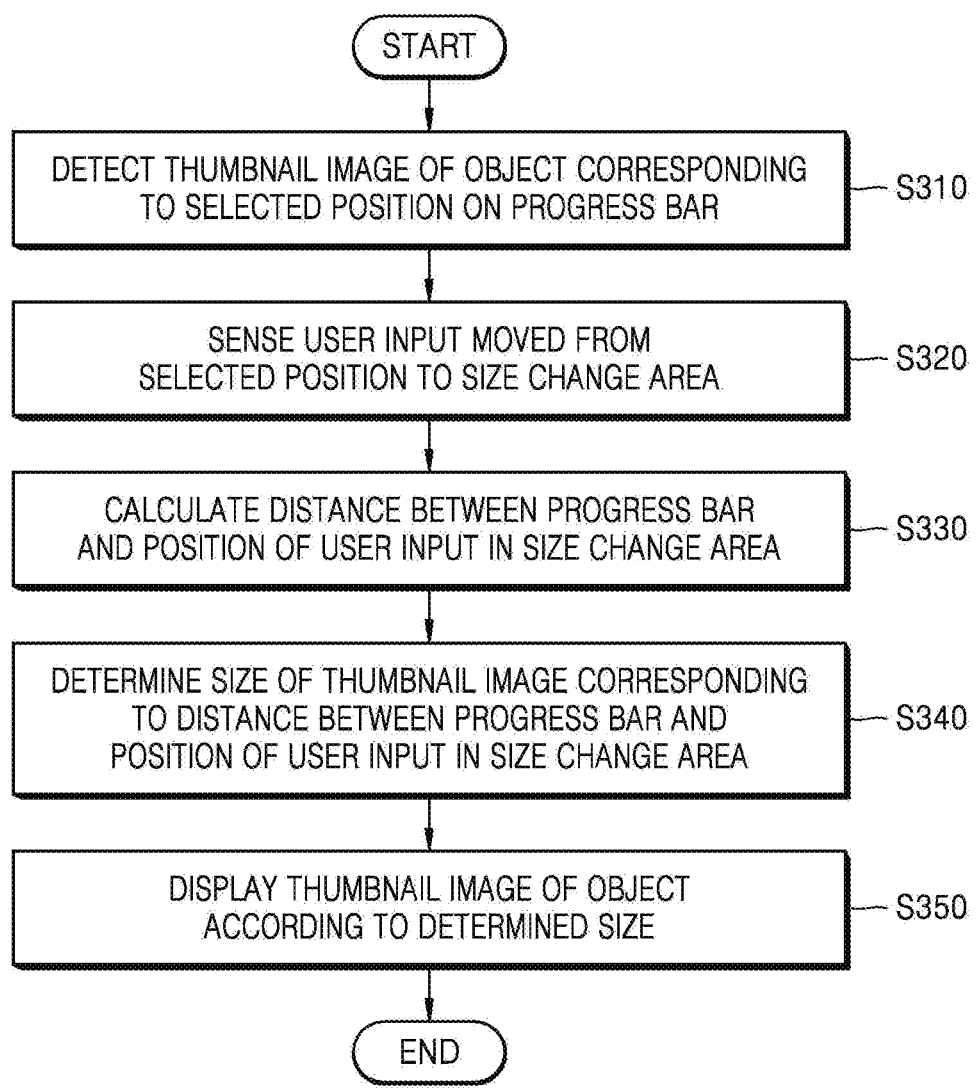

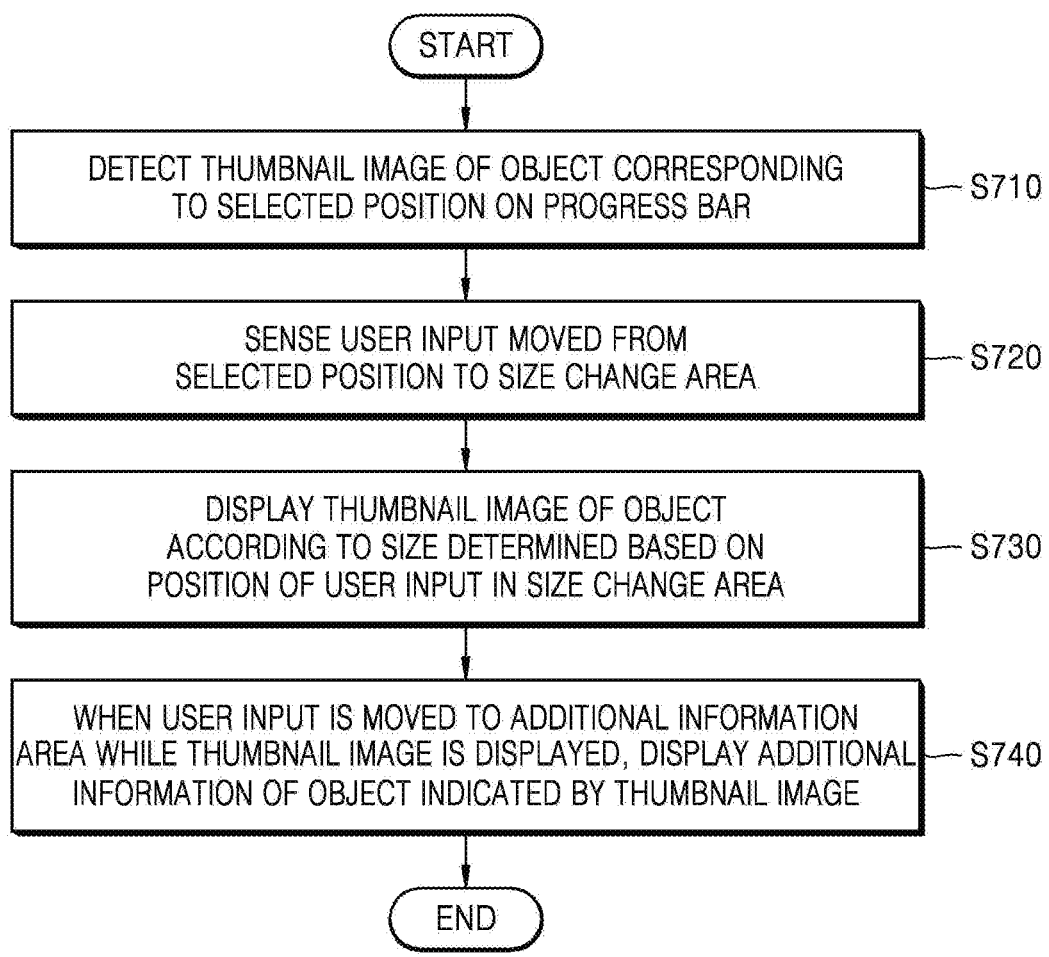

METHOD FOR DISPLAYING OBJECT ON DEVICE AND DEVICE THEREFOR

CROSS-REFERENCE TO RELATED APPLICATION(S)

This application is a continuation application of prior application Ser. No. 15/511,529, filed on Mar. 15, 2017, which is a U.S. National Stage application under 35 U.S.C. § 371 of an International application number PCT/KR2015/009600, filed on Sep. 14, 2015, which is based on and claimed priority of a Korean patent application number 10-2014-0122031, filed on Sep. 15, 2014, in the Korean Intellectual Property Office, the disclosure of which is incorporated by reference herein in its entirety.

TECHNICAL FIELD

The present disclosure relates to a method of displaying an object on a device, a device that displays an object, and a recording medium having recorded thereon a program for executing the method of displaying an object.

BACKGROUND ART

Due to developments in communication technologies and display technologies, content may be digitized and displayed on electronic devices. Recently, various print media are being digitized and provided to users.

For example, a user may receive a plurality of items of content that are digitized media such as images, videos, documents, textbooks, magazines, newspapers, etc., via an electronic device including a display.

Recently, user interfaces having various functions are being developed to provide digital content to users. In particular, a study of a method of processing and displaying digital content is actively been performed to allow user-desired content to be easily found, managed, and edited.

DETAILED DESCRIPTION OF THE INVENTION

Technical Problem

Provided are a method of easily providing information about an object to a user, and a device that performs the method, when the object is displayed by the device.

Technical Solution

According to an aspect of the present disclosure, there is provided a method of displaying an object on a device, the method including detecting a thumbnail image of an object corresponding to a selected position on a progress bar providing search information regarding a plurality of objects that are displayed according to an order; obtaining a user input moved from the selected position to a size change area; and displaying the thumbnail image of the object, the thumbnail image having a size determined based on a position of the user input in the size change area.

Advantageous Effects

Information about an object can be easily provided to a user.

DESCRIPTION OF THE DRAWINGS

FIG. 3 is a flowchart for describing a method of determining a size of a displayed thumbnail image 240 according to a distance between a position of a user input 5 in a size change area and a progress bar, the method being performed by the device, according to an embodiment.

FIG. 7 is a flowchart for describing a method of displaying both the thumbnail image and additional information of an object, the method being performed by the device, according to an embodiment.

BEST MODE

Figure 1:
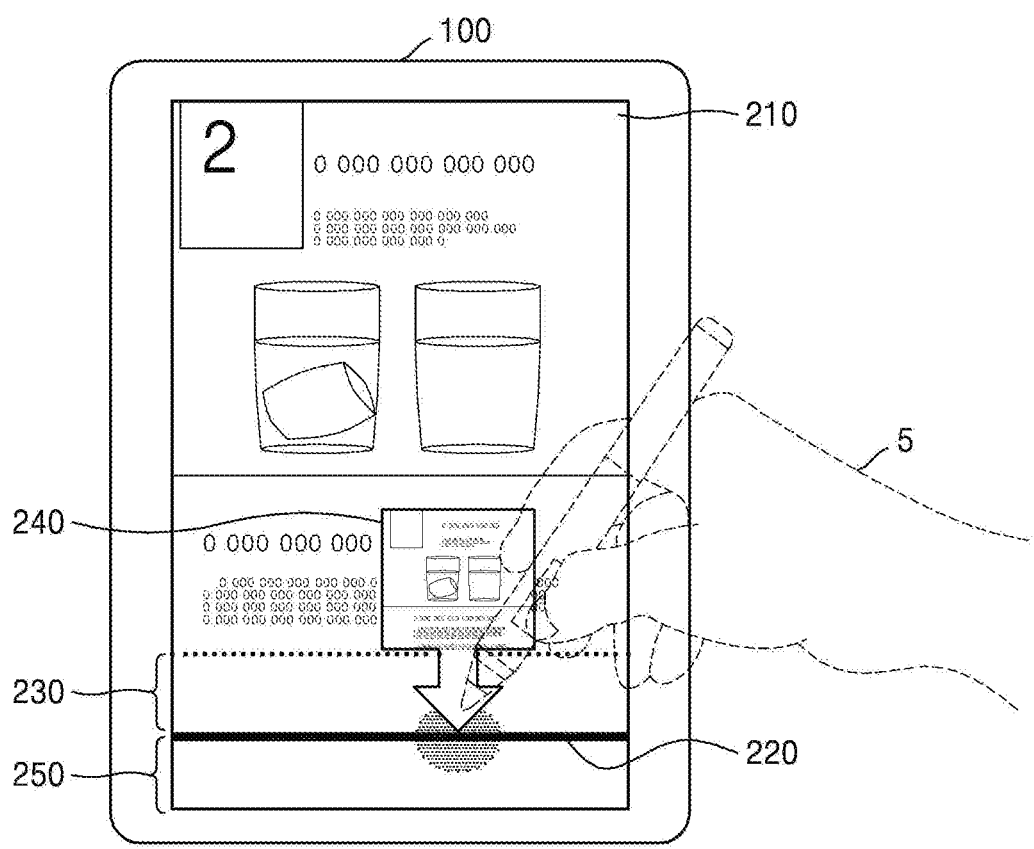
FIG. 1 is a conceptual diagram for describing a method of displaying an object on a device, according to an embodiment.

According to an aspect of the present disclosure, there is provided a method of displaying an object on a device, the method including detecting a thumbnail image of an object corresponding to a selected position on a progress bar providing search information regarding a plurality of objects that are displayed according to an order; obtaining a user input moved from the selected position to a size change area; and displaying the thumbnail image of the object, the thumbnail image having a size determined based on a position of the user input in the size change area.

The displaying of the thumbnail image of the object may include determining the size of the thumbnail image of the object, according to a distance between the progress bar and the position of the user input in the size change area.

When the position of the user input in the size change area is changed in one direction along the progress bar, the method may further include displaying a thumbnail image of an object corresponding to the changed position, wherein the thumbnail image has the determined size.

When the position of the user input exits the size change area, the method may further include deleting the displayed thumbnail image.

When a hovering input is maintained for at least a preset period of time, the method may further include displaying the progress bar.

The method may further include selecting a position on the progress bar from which the hovering input is obtained for at least preset period of time.

When the user input is moved to an additional information area while the thumbnail image is being displayed, the method may further include displaying additional information of the object indicated by the thumbnail image.

According to another aspect of the present disclosure, there is provided a method of displaying an object on a device, the method including obtaining a user input moved from a selected position to an additional information area, the selected position being on a progress bar providing search information regarding a plurality of objects that are displayed according to an order; detecting an object corresponding to the selected position; and displaying additional information of the detected object.

The displaying of the additional information of the detected object may include determining a type of the displayed additional information, based on a distance between the progress bar and a position of the user input in the additional information area.

When the position of the user input in the additional information area is changed in one direction along the progress bar, the method may further include displaying additional information of an object corresponding to the changed position.

When the position of the user input exits the additional information area, the method may further include deleting the displayed additional information.

When the user input is moved to a size change area while the additional information is displayed, the method may further include displaying a thumbnail image of the detected object.

According to another aspect of the present disclosure, there is provided a device for displaying an object, the device including a controller configured to detect a thumbnail image of an object corresponding to a selected position on a progress bar providing search information regarding a plurality of objects that are displayed according to an order; a user input unit configured to obtain a user input moved from the selected position to a size change area; and an output unit configured to display the thumbnail image of the object, the thumbnail image having a size determined based on a position of the user input in the size change area.

The controller may be further configured to determine the size of the thumbnail image of the object, according to a distance between the progress bar and the position of the user input in the size change area.

When the position of the user input in the size change area is changed in one direction along the progress bar, the output unit may be further configured to display a thumbnail image of an object corresponding to the changed position, wherein the thumbnail image has the determined size.

When the position of the user input exits the size change area, the controller may be further configured to delete the displayed thumbnail image.

When a hovering input is obtained for at least preset period of time, the controller may be further configured to display the progress bar.

The controller may be further configured to select a position on the progress bar from which the hovering input is obtained for at least preset period of time.

When the user input is moved to an additional information area while the thumbnail image is being displayed, the output unit may be further configured to display additional information of the object indicated by the thumbnail image.

According to another aspect of the present disclosure, there is provided a device that displays an object, the device including a user input unit configured to obtain a user input moved from a selected position to an additional information area, the selected position being on a progress bar providing search information regarding a plurality of objects that are displayed according to an order; a controller configured to detect an object corresponding to the selected position; and an output unit configured to display additional information of the detected object.

The controller may be further configured to determine a type of the displayed additional information, based on a distance between the progress bar and a position of the user input in the additional information area.

When the position of the user input in the additional information area is changed in one direction along the progress bar, the output unit may be further configured to display additional information of an object corresponding to the changed position.

When the position of the user input exits the additional information area, the controller may be further configured to delete the displayed additional information.

When the user input is moved to a size change area while the additional information is displayed, the output unit may be further configured to display a thumbnail image of the detected object

MODE OF THE INVENTION

Hereinafter, terms that are used in the specification will be briefly described, and the disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

The disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art. In the following description, well-known functions or constructions are not described in detail since they would obscure the disclosure with unnecessary detail. Throughout the specification, like reference numerals in the drawings denote like or similar elements throughout the specification.

Throughout the specification, an application refers to a group of computer programs aimed to perform a particular task. The application described in the specification may vary. For example, the application may include, but is not limited to, a gallery application, a scheduler application, a memo application, a digital book application, or the like.

FIG. 1 is a conceptual diagram for describing a method of displaying an object on a device 100, according to an embodiment.

When the device 100 executes an application, at least one object (e.g., an object 210) related to execution of the application is displayed on a screen of the device 100. The object 210 related to execution of the application may be displayed based on a preset order. In this regard, the object 210 may be independently displayed on the screen. Alternatively, objects may be sequentially displayed on the screen of the device 100 according to a preset order.

For example, when the device 100 executes a digital book application, each of pages configuring a digital book may be the object 210. The pages configuring the digital book may be sequentially displayed on the screen of the device 100 according to preset page numbers. As another example, when the device 100 executes a gallery application, each of pictures stored in the gallery application may be the object 210. The pictures stored in the gallery application may be sequentially displayed on the screen of the device 100 according to a preset order such as a stored-time order. As another example, when the device 100 executes a video reproduction application, each of frames configuring a video may be the object 210. The frames configuring the video may be sequentially displayed on the screen of the device 100 according to frame numbers. The examples are merely embodiments, and thus the present disclosure is not limited thereto.

A progress bar 220 may be displayed on the screen of the device 100 so as to provide search information regarding a plurality of objects (e.g., objects 210). In this regard, the progress bar 220 may sense a position of an object that is displayed in execution of an application and is from among all objects that are displayable on the device 100, and may indicate sensed position information. The progress bar 220 may indicate an area corresponding to each object, the area being a part of all areas corresponding to all displayable objects. A user may check position information of an object displayed on the screen, the object being from among all objects, based on information displayed on the progress bar 220.

The search information may include information regarding a status in which a display of objects (e.g., the objects 210) progresses when an application is executed in a device. For example, the search information may indicate a position of the object 210 that is currently being displayed from among all objects (e.g., the objects 210) that are displayable when the application is executed.

In addition, when a particular position on the progress bar 220 is selected while an entire length of the progress bar 220 is matched to all objects (e.g., the objects 210) that are displayable when the application is executed, identification information of an object corresponding to the particular position may be provided. In this regard, the identification information such as a thumbnail image 240 refers to information by which a particular object can be identified from among all objects. For example, referring to FIG. 1, when a position X is selected from the progress bar 220 due to a user input 5, the thumbnail image 240 corresponding to the position X may be displayed on the screen of the device 100.

The device 100 according to an embodiment provides, to the user, an area within a preset distance range with respect to the progress bar 220 as an area in which search information regarding an object may be edited, managed, and processed. For example, the device 100 may set an area within a first distance in an upward direction from the progress bar 220 to be a size change area 230. When the user input 5 is input to the size change area 230, a size of the thumbnail image 240 of a first object corresponding to the position X selected by the user may be changed. As another example, the device 100 may set an area within a second distance in a downward direction from the progress bar 220 to be an additional information area 250. When the user input 5 is input to the additional information area 250, additional information of the first object corresponding to the position X specified by the user may be displayed. In this regard, the additional information may include information for description with respect to the first object, the information including generation information, order information, a title, or the like about the first object corresponding to the position X, and user-input information related to the first object corresponding to the position X. These are exemplary, and the additional information may vary according to setting.

According to an order of inputting the user input 5 to an area set by the device 100, the thumbnail image 240 and the additional information of the object may be simultaneously displayed. Sizes of the thumbnail image 240 and the additional information displayed on the device 100 may be variously changed. This will be particularly described below.

Figure 2:
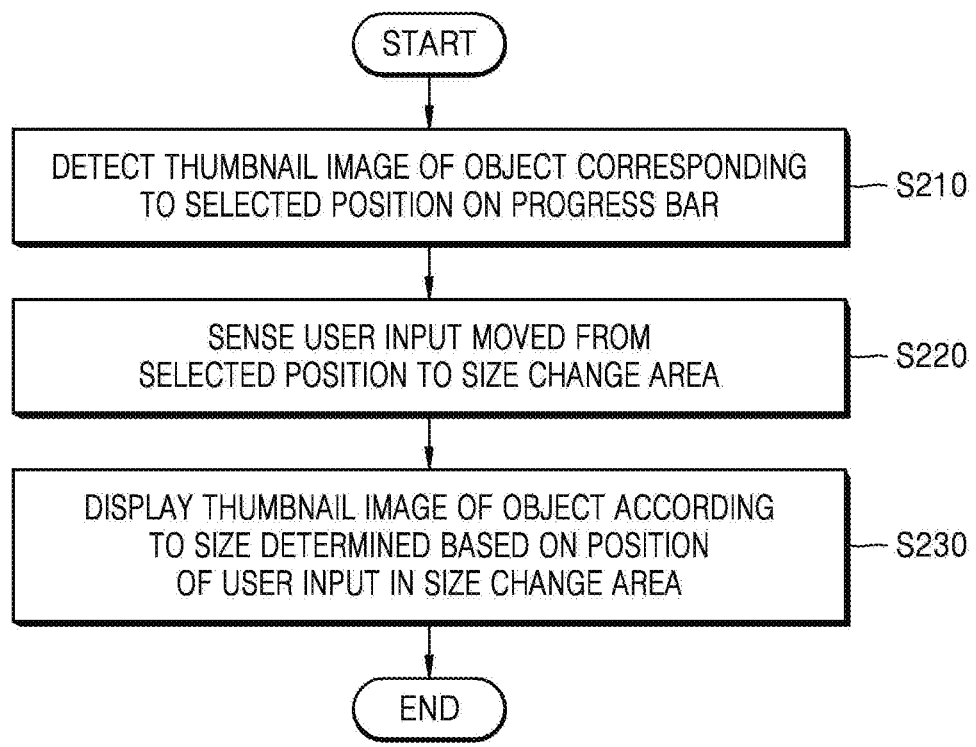
FIG. 2 is a flowchart of a method of displaying a thumbnail image of an object on the device, according to an embodiment.

FIG. 2 is a flowchart of a method of displaying a thumbnail image of an object on the device 100, according to an embodiment.

In operation 210, the device 100 detects a thumbnail image of an object corresponding to a selected position on a progress bar providing search information regarding a plurality of objects that are displayed according to an order. For example, a plurality of objects that may be displayed when the device 100 executes an application may respectively correspond to bar units obtained by equally dividing an entire portion of the progress bar 220. For example, when the device 100 obtains the user input 5 such as a hovering input over a bar unit of the progress bar 220 for at least preset period of time, the device 100 may select the object 210 corresponding to the bar unit at an obtained position.

The progress bar 220 may be constantly displayed on the screen of the device 100 while the application is being executed in the device 100, and may be displayed on the screen of the device 100 only when requested by the user. In the case where the progress bar 220 is displayed on the screen of the device 100 according to the request by the user, for example, when a hovering input is obtained for at least preset period of time while the application is being executed in the device 100, the progress bar 220 may be displayed on the screen of the device 100.

In operation 220, the device 100 obtains the user input 5 moved from a selected position to the size change area 230. While the thumbnail image 240 of the object 210 corresponding to the selected position is being displayed, the device 100 may obtain that the user input 5 is moved and is input to the size change area 230. In this regard, the device 100 may obtain a touch input, a drag input, a hovering input, or the like as the user input 5.

In operation 230, the device 100 displays the thumbnail image 240 of the object 210 according to a size determined based on a position of the user input 5 in the size change area 230. The device 100 according to an embodiment may determine the size of the displayed thumbnail image 240, based on a distance between the progress bar 220 and the position of the user input 5 in the size change area 230.

For example, when the user input 5 is positioned at a bar unit a of the progress bar 220, the device 100 may display, as a first size, a size of the thumbnail image 240 of the first object corresponding to the bar unit a. When the user input 5 is moved to the size change area 230 and then is positioned at a point that is distant from the bar unit a by a distance X in an upward direction, the device 100 may display the thumbnail image 240 with a second size that corresponds to the distance X according to pre-setting. A size of the displayed thumbnail image 240 may be changed according to a position of the user input 5 in the size change area 230. A change in a size of the thumbnail image 240 according to a position of the user input 5 in the size change area 230 will be particularly described below with reference to FIGS. 3 and 4A-C.

When a position of the user input 5 in the size change area 230 is changed in one direction along the progress bar 220, the device 100 according to an embodiment may display, as a determined size, a thumbnail image of an object corresponding to the changed position. This will be particularly described below with reference to FIGS. 5A to 5E.

FIGS. 5A, 5B, 5C, 5D, and 5E illustrate diagrams for describing a method of changing and displaying the thumbnail image 240 according to movement of the user input 5 in the size change area 230, the method being performed by the device 100, according to various embodiments.

Figure 5A:
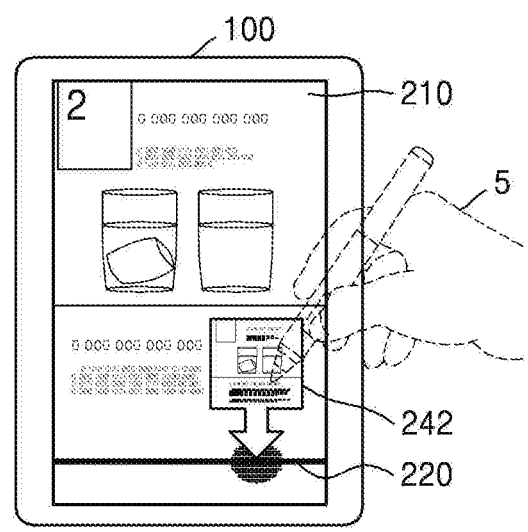
FIGS. 5A, 5B, 5C, 5D, and 5E illustrate diagrams for describing a method of changing and displaying a thumbnail image according to movement of a user input in the size change area, the method being performed by the device, according to various embodiments.

Referring to FIG. 5A, when the user input 5 is positioned at a bar unit a of the progress bar 220, the device 100 may display, as a first size, a size of a first thumbnail image 242 of a first object corresponding to the bar unit a.

Figure 5B:
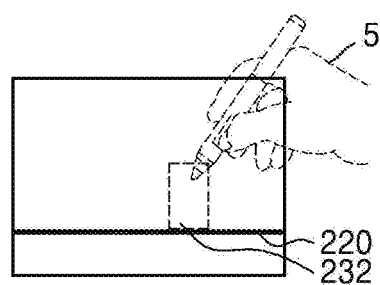

Referring to FIG. 5B, the device 100 may obtain that the user input 5 is moved to the size change area 230 and is positioned at a point being distant from the bar unit a by a distance X in an upward direction. The device 100 may divide the size change area 230 into cells each having a preset size, and may determine a size of a thumbnail image (e.g., the thumbnail image 240) to be displayed on the screen of the device 100 for each of the divided cells. The device 100 may obtain the user input 5 at a first cell 232, and may determine a size of a first thumbnail image 242 corresponding to the first cell 232.

Figure 5C:
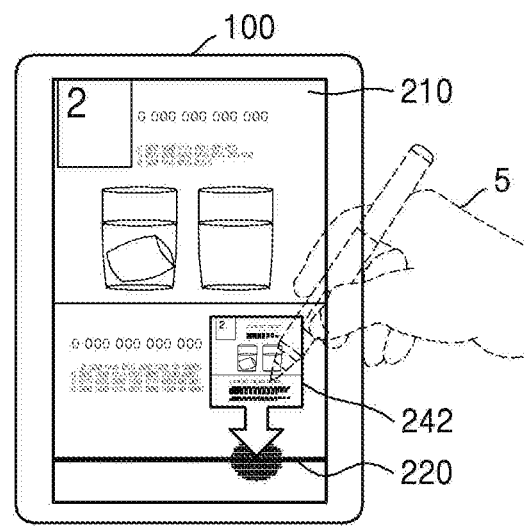

Referring to FIG. 5C, the device 100 may display, on the screen of the device 100, the size of the first thumbnail image 242 as a second size according to the determined size.

Figure 5D:
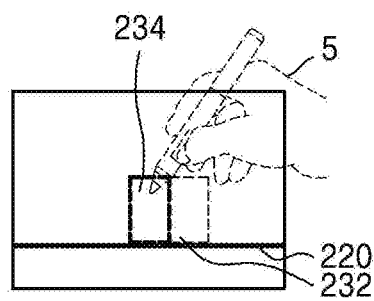

Referring to FIG. 5D, when a position of the user input 5 in the size change area 230 is changed, the device 100 may obtain the changed position of the user input 5. For example, the device 100 may obtain that the position of the user input 5 in the size change area 230 is changed from the first cell 232 to a second cell 234.

Figure 5E:
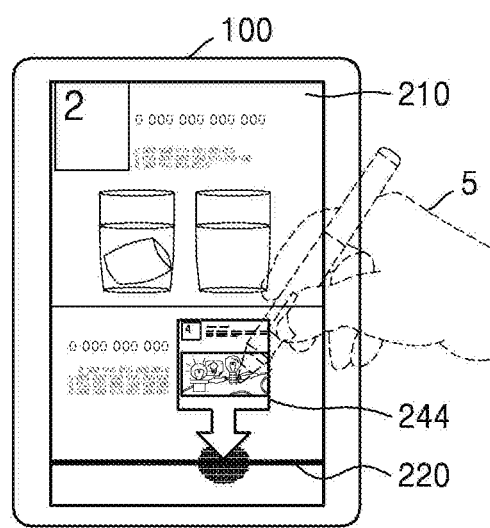

Referring to FIG. 5E, the device 100 may determine a bar unit b of the progress bar 220 corresponding to the changed second cell 234. The device 100 may display, as a second size, a thumbnail image 244 of a second object corresponding to the bar unit b. In this regard, since the second cell 234 and the first cell 232 are distant from the progress bar 220 by an equal distance in an upward direction, the second cell 234 and the first cell 232 may have a same size. In another embodiment, when the user input 5 and the first cell 232 are not distant from the progress bar 220 by an equal distance in an upward direction, a thumbnail image having a changed size may be displayed. For example, when the user input 5 is moved to a cell positioned in a diagonal direction from the first cell 232, a type and size of a displayed thumbnail image may be changed.

Referring back to FIG. 2, when the user input 5 exits the size change area 230, the device 100 according to an embodiment may delete the thumbnail image 240 displayed on the screen of the device 100. This will be particularly described below with reference to FIGS. 6A to 6E.

FIGS. 6A, 6B, 6C, 6D, and 6E illustrate diagrams for describing a method of deleting the displayed thumbnail image 240 when the user input 5 exits the size change area 230 while the device 100 is displaying the thumbnail image 240, the method being performed by the device 100, according to various embodiments.

Figure 6A:
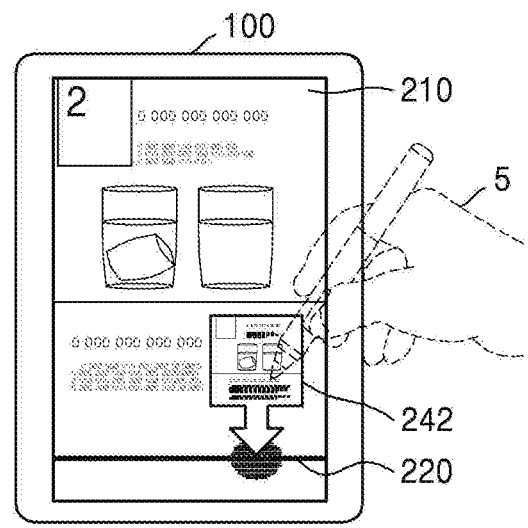
FIGS. 6A, 6B, 6C, 6D, and 6E illustrate diagrams for describing a method of deleting the displayed thumbnail image when the user input exits the size change area while the device is displaying the thumbnail image, the method being performed by the device, according to various embodiments.

Referring to FIG. 6A, when the user input 5 is positioned at a bar unit a of the progress bar 220, the device 100 may display, as a first size, a size of a first thumbnail image 242 of a first object corresponding to the bar unit a.

Figure 6B:
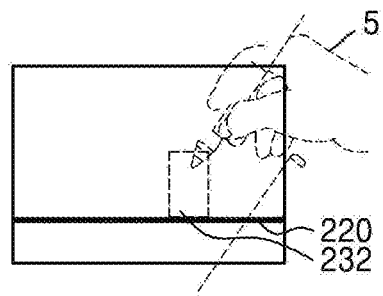

Referring to FIG. 6B, the device 100 may obtain that the user input 5 is moved to the size change area 230 and is positioned in a first cell 232 at a point being distant from the bar unit a by a distance X in an upward direction. The device 100 may determine a size of the first thumbnail image 242 corresponding to the first cell 232.

Figure 6C:
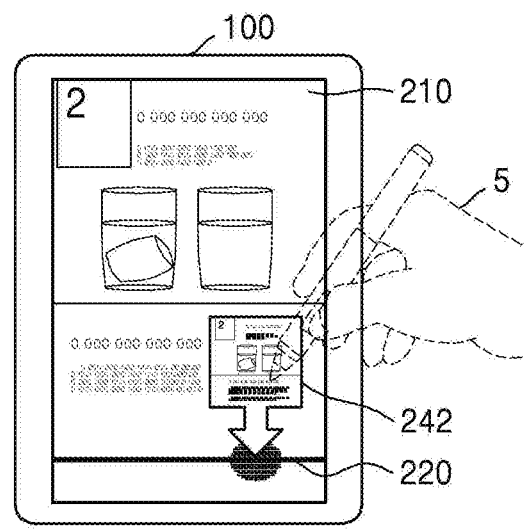

Referring to FIG. 6C, the device 100 may display, on the screen of the device 100, the first thumbnail image 242 having a second size according to the determined size.

Figure 6D:
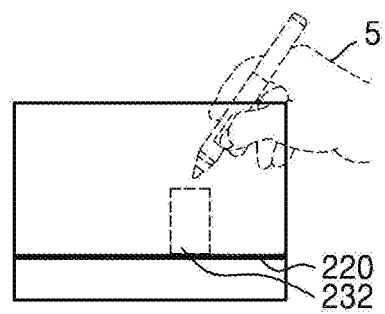

Referring to FIG. 6D, the device 100 may obtain that a position of the user input 5 exits the size change area 230. In this regard, a position and size of the size change area 230 on the device 100 may vary according to setting.

Figure 6E:
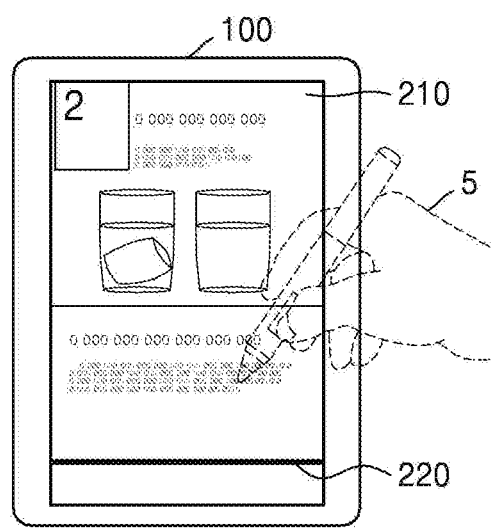

Referring to FIG. 6E, since the position of the user input 5 exits the size change area 230, the device 100 may delete the first thumbnail image 242 displayed on the screen.

FIG. 3 is a flowchart for describing a method of determining a size of the displayed thumbnail image 240 according to a distance between a position of the user input 5 in the size change area 230 and the progress bar 220, the method being performed by the device 100, according to an embodiment.

In operation 310, the device 100 detects a thumbnail image of an object corresponding to a selected position on a progress bar providing search information regarding a plurality of objects that are displayed according to an order. For example, when the device 100 obtains the user input 5 such as a hovering input over a bar unit of the progress bar 220 for at least preset period of time, the device 100 may select the object 210 corresponding to the bar unit at an obtained position.

Operation 310 may correspond to aforementioned operation 210 of FIG. 2.

In operation 320, the device 100 obtains the user input 5 moved from the selected position to the size change area 230. While the thumbnail image 240 of the object 210 corresponding to the selected position is being displayed, the device 100 may obtain that the user input 5 is moved and is input to the size change area 230.

Operation 320 may correspond to aforementioned operation 220 of FIG. 2.

In operation 330, the device 100 calculates a distance between the progress bar 220 and a position of the user input 5 in the size change area 230. For example, when the user input 5 is moved to the size change area 230 while the first thumbnail image 242 corresponding to the first object is being selected from the progress bar 220, the device 100 may calculate a distance between the progress bar 220 and a moved position of the user input 5.

When the user input 5 is maintained in the size change area 230 for at least preset period of time, the device 100 may determine a position of the user input 5. The device 100 may calculate a distance between the progress bar 220 and the determined position of the user input 5.

In operation 340, the device 100 determines a size of the thumbnail image corresponding to the distance between the progress bar 220 and the position of the user input 5 in the size change area 230.

For example, when the user input 5 is positioned at the bar unit a of the progress bar 220, the device 100 may assume that a size of the thumbnail image 240 of the first object corresponding to the bar unit a to be a first size.

When the user input 5 is moved to the size change area 230 and then is positioned at a point that is distant from the bar unit a by a distance X in an upward direction, the device 100 may determine the size of the thumbnail image 240 to be a second size that corresponds to the distance X according to pre-setting. When the user input 5 is moved again from the size change area 230 and then is positioned at a point that is distant from the bar unit a by a distance Y in the upward direction, the device 100 may determine the size of the thumbnail image 240 to be a third size that corresponds to the distance Y according to pre-setting.

In operation 350, the device 100 displays the thumbnail image 240 of the object 210 according to a size determined based on the position of the user input 5 in the size change area 230.

Operation 350 may correspond to aforementioned operation 230 of FIG. 2.

Figure 4A:
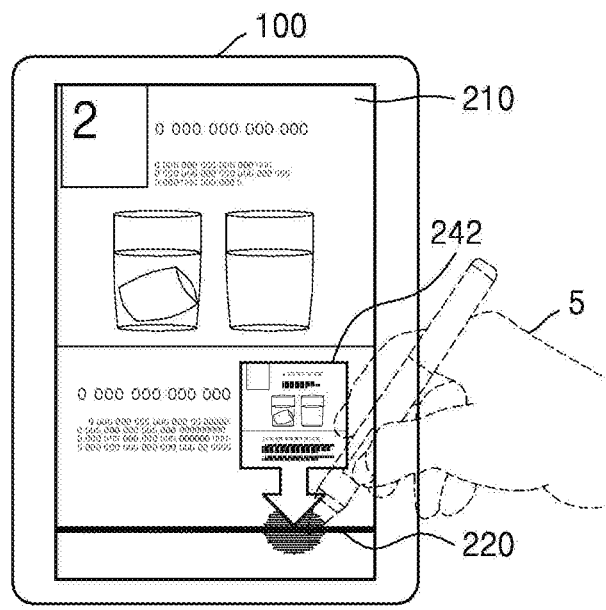
FIGS. 4A, 4B, and 4C illustrate diagrams for describing a size of the thumbnail image 240 which is changed according to a distance between a position of the user input 5 in the size change area and the progress bar, according to various embodiments.
Figure 4B:
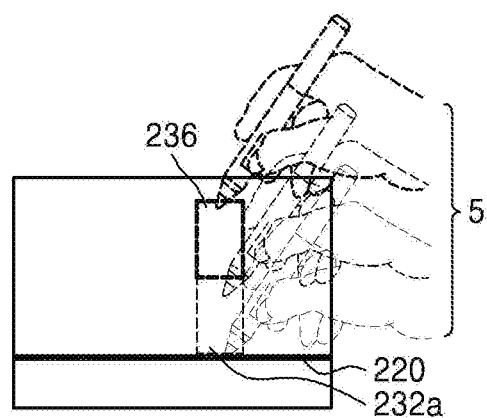
Figure 4C:
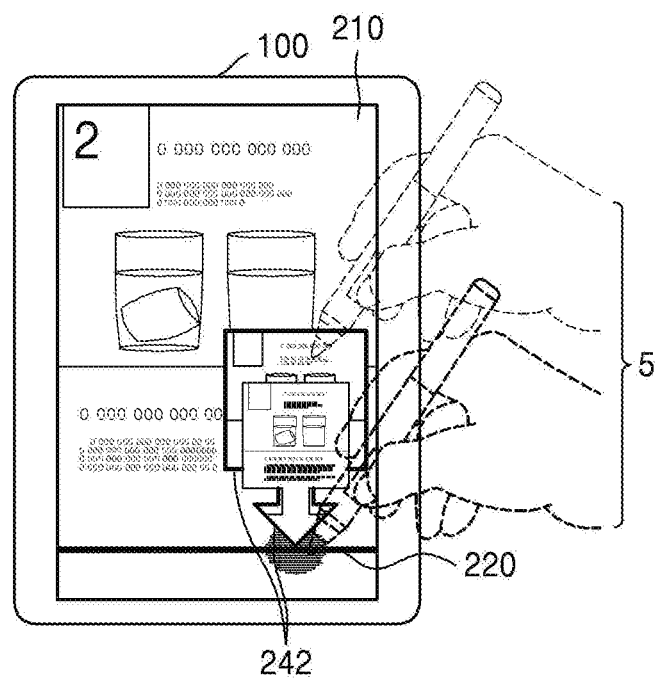

FIGS. 4A, 4B, and 4C illustrate diagrams for describing a size of the thumbnail image 240 which is changed according to a distance between a position of the user input 5 in the size change area 230 and the progress bar 220, according to various embodiments.

Referring to FIG. 4A, when the user input 5 is positioned at a bar unit a of the progress bar 220, the device 100 may display, as a first size, a size of a first thumbnail image 242 of a first object corresponding to the bar unit a.

Referring to FIG. 4B, the device 100 may obtain that the user input 5 is moved to the size change area 230 and then is positioned at a point that is distant from the bar unit a by a distance X in an upward direction.

The device 100 may divide the size change area 230 into cells each having a preset size, and may determine a size of a thumbnail image (e.g., the thumbnail image 240) displayed on the screen of the device 100 according to each of the divided cells. The device 100 may determine that a cell including a point being distant from the bar unit a by the distance X in the upward direction, the user input 5 being positioned at the bar unit a, is a first cell 232a. The device 100 may determine a size of the first thumbnail image 242 corresponding to the first cell 232a to be a second size.

Referring to FIG. 4B, the device 100 may obtain that the user input 5 is moved to the size change area 230 and then is positioned at a point above and at a distance Y from the bar unit a. The device 100 may determine that a cell including the point above and at the distance Y from the bar unit a, the user input 5 being positioned at the bar unit a, is a third cell 236. The device 100 may determine a size of the first thumbnail image 242 corresponding to the third cell 236 to be a third size.

Referring to FIG. 4C, the device 100 may display the first thumbnail image 242 on the screen of the device 100 according to the determined sized. When the user input 5 is obtained from the first cell 232a, the device 100 may display the first thumbnail image 242 having the second size on the screen of the device 100. When the user input 5 is obtained from the third cell 236, the device 100 may display the first thumbnail image 242 having the third size on the screen of the device 100.

According to another embodiment, the device 100 may adjust an interval between objects that are searchable on the progress bar 220, according to a distance between the progress bar 220 and a position of the user input 5 in the size change area 230. For example, when the device 100 obtains the user input 5 from the size change area 230 that is above and at the distance Y from the progress bar 220, the device 100 may set the interval between the objects that are searchable on the progress bar 220 to be a first unit. In the case where an application that is executed in the device 100 is a book application, when the device 100 obtains the user input 5 from the size change area 230 that is above and at the distance Y from the progress bar 220, the device 100 may set pages to be searched on the progress bar 220 at an interval of 10 pages.

In addition, when the device 100 obtains the user input 5 from the size change area 230 that is above and at the distance Y from the progress bar 220, the device 100 may set the interval between the objects that are searchable on the progress bar 220 to be a second unit. In the case where an application that is executed in the device 100 is the book application, when the device 100 obtains the user input 5 from the size change area 230 that is above and at the distance Y from the progress bar 220, the device 100 may set the pages to be searched on the progress bar 220 at an interval of 20 pages.

FIG. 7 is a flowchart for describing a method of displaying both the thumbnail image 240 and additional information of an object, the method being performed by the device 100, according to an embodiment.

In operation 710, the device 100 detects a thumbnail image of an object corresponding to a selected position on a progress bar providing search information regarding a plurality of objects that are displayed according to an order. For example, when the device 100 obtains the user input 5 such as a hovering input over a bar unit of the progress bar 220 for at least preset period of time, the device 100 may select the object 210 corresponding to the bar unit at an obtained position.

Operation 710 may correspond to aforementioned operation 210 of FIG. 2.

In operation 720, the device 100 obtains the user input 5 moved from the selected position to the size change area 230. While the thumbnail image 240 of the object 210 corresponding to the selected position is being displayed, the device 100 may obtain that the user input 5 is moved and is input to the size change area 230.

Operation 720 may correspond to aforementioned operation 220 of FIG. 2.

In operation 730, the device 100 displays the thumbnail image 240 of the object 210 according to a size determined based on a position of the user input 5 in the size change area 230.

Operation 730 may correspond to aforementioned operation 230 of FIG. 2.

In operation 740, when the user input 5 is moved to the additional information area 250 while the thumbnail image 240 is being displayed, the device 100 displays additional information of an object indicated by the thumbnail image 240.

The device 100 may set an area within a second distance in a downward direction from the progress bar 220 to be the additional information area 250. When the user input 5 is input to the additional information area 250, additional information of a first object corresponding to a position X specified by a user may be displayed. In this regard, additional information may include information for description with respect to an object, wherein the information includes generation information, order information, a title, or the like about the object and is input by the user. These are exemplary, and the additional information may vary according to setting.

A method of displaying both the thumbnail image 240 and additional information of an object, the method being performed by the device 100, will be particularly described below with reference to FIG. 8.

Figure 8:
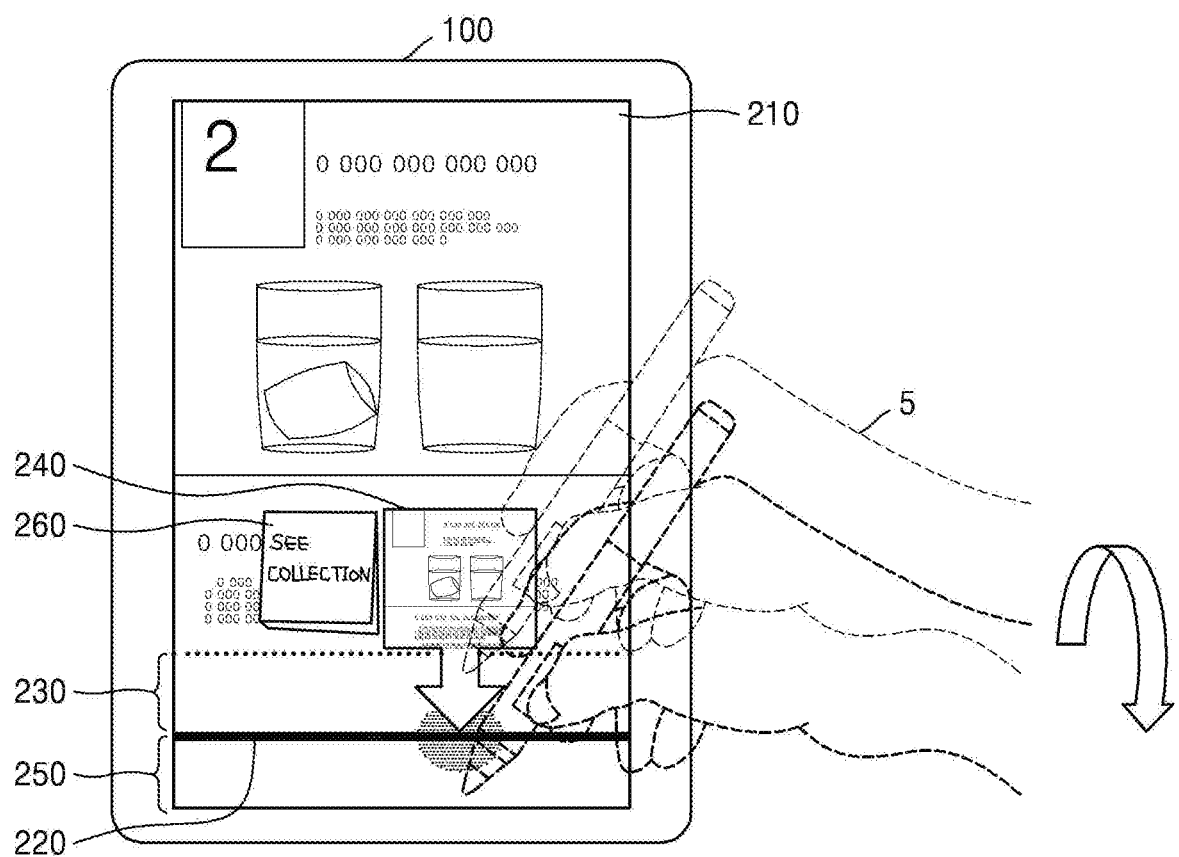
FIG. 8 is a diagram for describing a method of displaying both the thumbnail image and additional information of an object on a screen of the device, the method being performed by the device, according to an embodiment.

FIG. 8 is a diagram for describing a method of displaying both the thumbnail image 240 and additional information of an object on the screen of the device 100, the method being performed by the device 100, according to an embodiment.

Referring to FIG. 8, the device 100 may obtain that the user input 5 is moved to the size change area 230 and is positioned in a first cell at a point above and at a distance Y from a bar unit a. The device 100 may determine a size of a first thumbnail image corresponding to the first cell 232. The device 100 may display, on the screen of the device 100, the first thumbnail image 242 according to the determined size.

According to an embodiment, the device 100 may obtain the user input 5 moved from the size change area 230 to the additional information area 250. In this regard, the device 100 may obtain a hovering input, a touch input, a drag input, or the like as the user input 5. When the user input 5 is moved from the size change area 230 to the additional information area 250, the device 100 may display additional information 260 of a first object corresponding to the first thumbnail image 242. For example, the device 100 may display the first thumbnail image 242 along with a memo as the additional information 260 of the first object, wherein a user wrote the memo about the object.

The device 100 may display the additional information 260 on a preset area. For example, referring to FIG. 8, the device 100 may display the additional information 260 on the left side of the displayed thumbnail image 240. The example is merely an embodiment, and thus the present disclosure is not limited thereto. The user may previously set a position of the additional information 260 to be displayed on the device 100.

Figure 9:
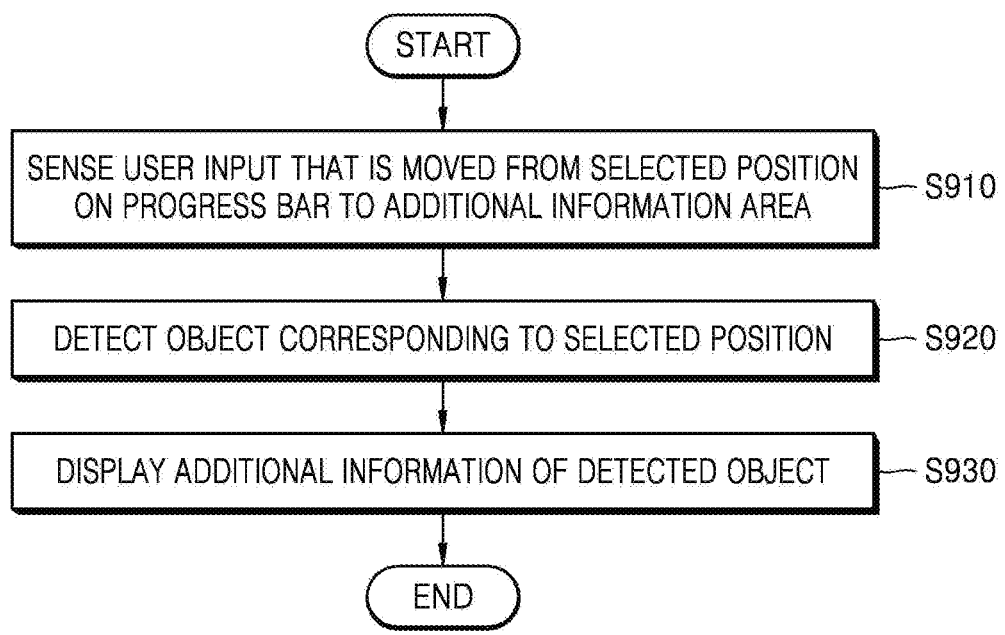
FIG. 9 is a flowchart for describing a method of displaying the additional information of an object, the method being performed by the device, according to an embodiment.

FIG. 9 is a flowchart for describing a method of displaying the additional information 260 of an object, the method being performed by the device 100, according to an embodiment.

In operation 910, the device 100 detects an object corresponding to a selected position on the progress bar 220 providing search information regarding a plurality of objects that are displayed according to an order. When the user input 5 is obtained on the progress bar 220, the device 100 may detect the object 210 corresponding to a bar unit at a position from which the user input 5 is obtained. For example, when the device 100 obtains the user input 5 such as a hovering input over the bar unit of the progress bar 220 for at least preset period of time, the device 100 may detect the object 210 corresponding to the bar unit at the obtained position In operation 920, the device 100 obtains the user input 5 that is moved from the selected position to the additional information area 250. In this regard, the device 100 may obtain a touch input, a drag input, a hovering input, or the like as the user input 5. The device 100 may set an area within a second distance in a downward direction from the progress bar 220 to be the additional information area 250.

In operation 930, the device 100 displays the additional information 260 of the detected object. For example, when the user input 5 is input to the additional information area 250, the device 100 may display additional information of a first object corresponding to a position X selected by a user.

When a position of the user input 5 in the additional information area 250 is changed in one direction along the progress bar 220, the device 100 according to an embodiment may determine a type of the additional information 260 corresponding to the changed position, and may display the determined additional information 260. This will be particularly described below with reference to FIGS. 12A to 12E.

FIGS. 12A, 12B, 12C, 12D, and 12E illustrate diagrams for describing a method of changing and displaying the additional information 260 according to movement of the user input 5 in the additional information area 250, the method being performed by the device 100, according to various embodiments.

Figure 12A:
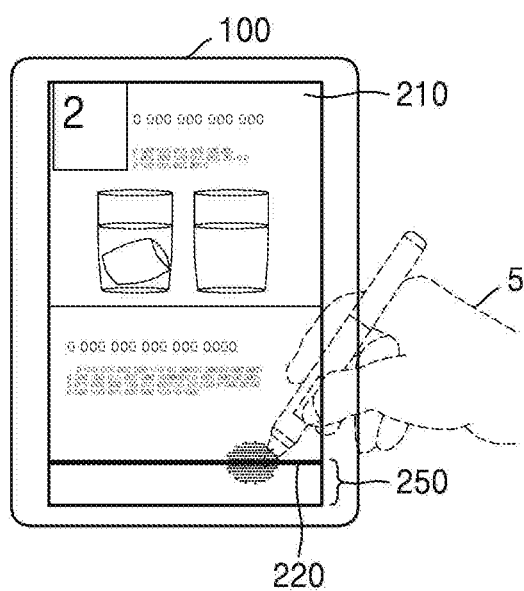
FIGS. 12A, 12B, 12C, 12D, and 12E illustrate diagrams for describing a method of changing and displaying the additional information according to movement of the user input in the additional information area, the method being performed by the device, according to various embodiments.

Referring to FIG. 12A, when the user input 5 is positioned at a bar unit a of the progress bar 220, the device 100 may detect a first object corresponding to the bar unit a.

Figure 12B:
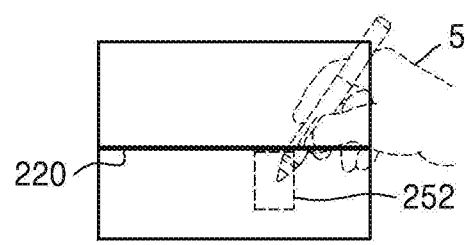

Referring to of FIG. 12B, the device 100 may obtain that the user input 5 is moved to the additional information area 250 and is positioned at a point below and at a distance Z from the bar unit a. The device 100 may divide the additional information area 250 into cells each having a preset size, and may determine a type of the additional information 260 to be displayed on the screen of the device 100 for each of the divided cells.

Figure 12C:
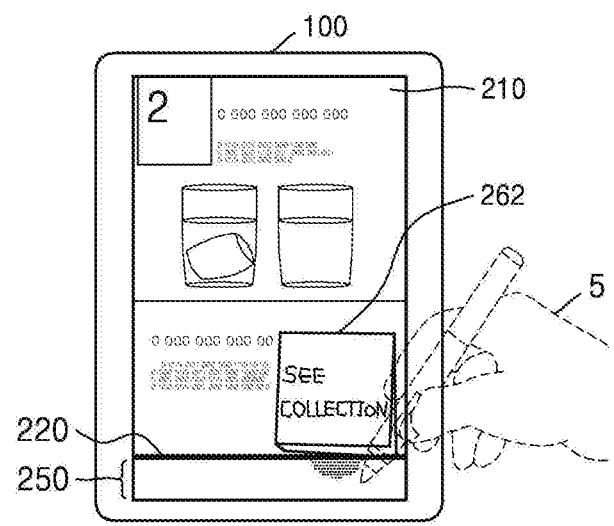

Referring to FIG. 12C, the device 100 may display, on the screen of the device 100, additional information 262 determined with respect to the determined first object. For example, in the case where the first object is a first picture image from among a plurality of picture images stored in a gallery application, the device 100 may display, as the first additional information 262, information regarding a date, a time, or the like where the picture image was captured.

Figure 12D:
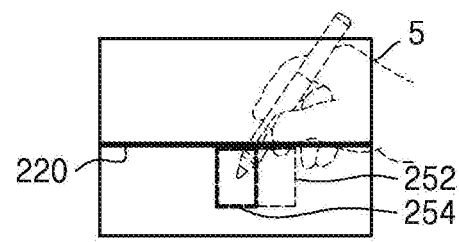

Referring to FIG. 12D, when the position of the user input 5 in the additional information area 250 is changed, the device 100 may obtain the changed position of the user input 5. For example, the device 100 may obtain that the position of the user input 5 in the additional information area 250 is changed from a first cell 252 to a second cell 254.

Figure 12E:
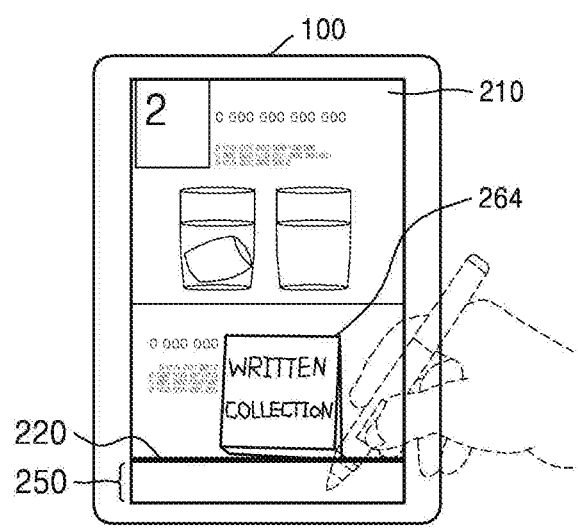

Referring to FIG. 12E, the device 100 may determine a bar unit b of the progress bar 220 corresponding to the second cell 254. The device 100 may display additional information 264 of a second object corresponding to the bar unit b. In this regard, since the second cell 254 and the first cell 252 are distant from the progress bar 220 by an equal distance in the downward direction, a same type of the additional information 264 may be displayed.

Referring back to FIG. 9, when the user input 5 exits the additional information area 250, the device 100 according to an embodiment may delete the additional information 264 displayed on the screen of the device 100. This will be particularly described below with reference to FIGS. 13A to 13E.

FIGS. 13A, 13B, 13C, 13D, and 13E illustrate diagrams for describing a method of deleting the displayed thumbnail image 240 when the user input 5 exits the additional information area 250 while the device 100 is displaying the thumbnail image 240, the method being performed by the device 100, according to various embodiments.

Figure 13A:
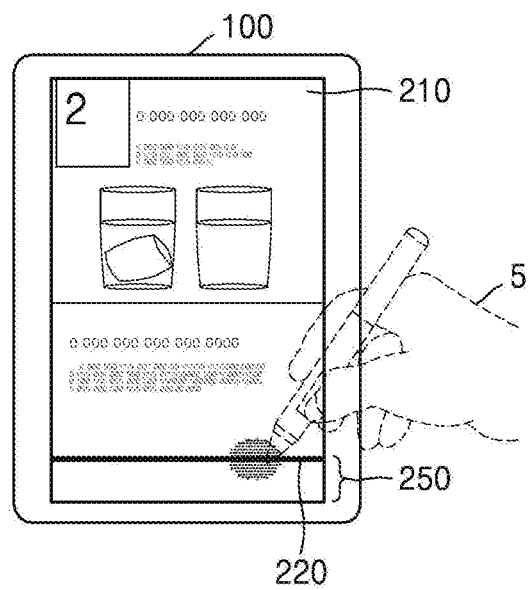
FIGS. 13A, 13B, 13C, 13D, and 13E illustrate diagrams for describing a method of deleting the displayed thumbnail image when the user input exits the additional information area while the device displays the thumbnail image, the method being performed by the device, according to various embodiments.

Referring to FIG. 13A, when the user input 5 is positioned at a bar unit a of the progress bar 220, the device 100 may detect a first object corresponding to the bar unit a.

Figure 13B:
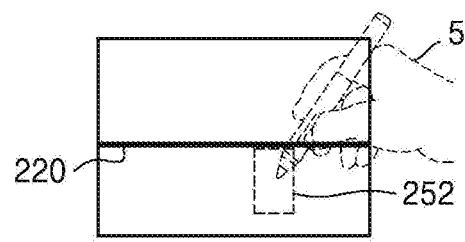

Referring to FIG. 13B, the device 100 may obtain that the user input 5 is moved to the additional information area 250 and is positioned at a point below and at a distance Z from the bar unit a. The device 100 may divide the additional information area 250 into cells each having a preset size, and may determine a type of the additional information 260 to be displayed on the screen of the device 100 for each of the divided cells.

Figure 13C:
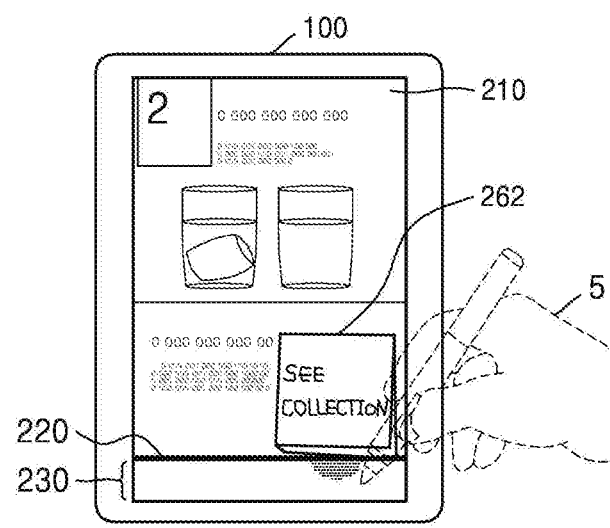

Referring to FIG. 13C, the device 100 may display, on the screen of the device 100, first additional information 262 determined with respect to the determined first object.

Figure 13D:
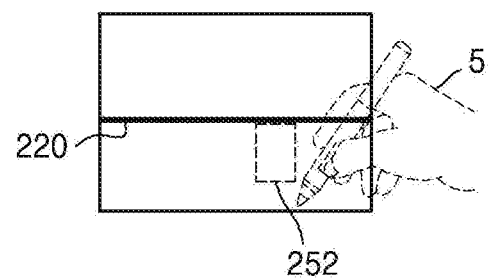

Referring to FIG. 13D, the device 100 may obtain that a position of the user input 5 exits the additional information area 250. In this regard, a position and size of the additional information area 250 on the device 100 may vary according to setting.

Figure 13E:
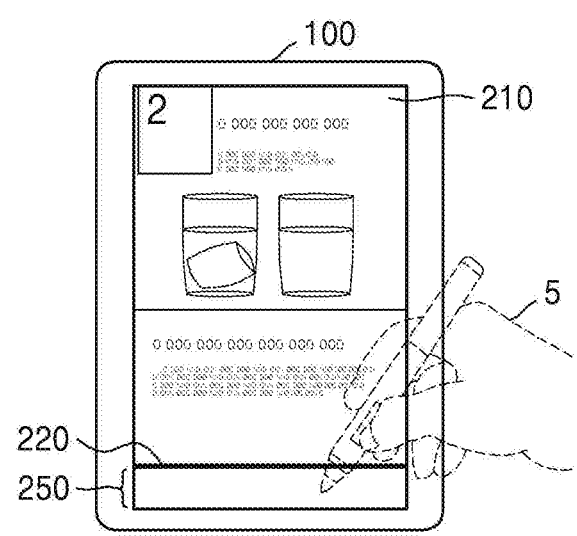

Referring to FIG. 13E, since the position of the user input 5 exits the additional information area 250, the device 100 may delete the first additional information 262 displayed on the screen.

Hereinafter, with reference to FIGS. 10A to 10C, a method of displaying the additional information 260 of an object on the device 100 will now be described in detail.

Figure 10A:
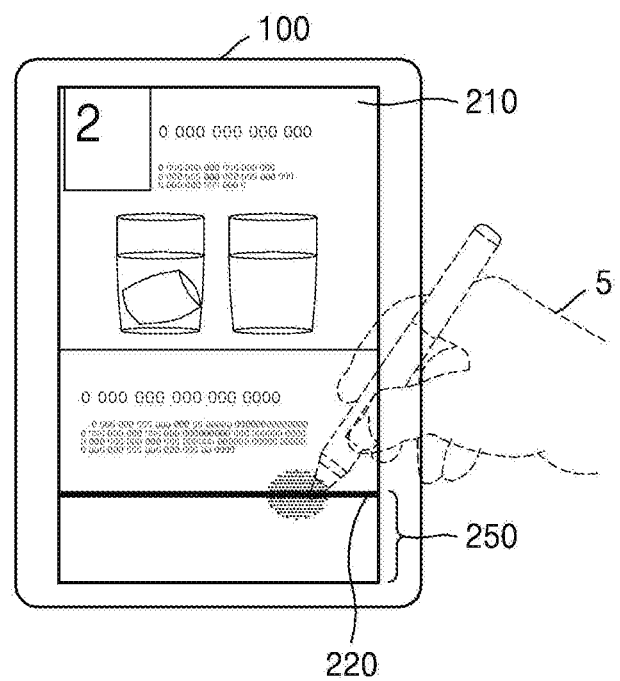
FIGS. 10A, 10B, and 10C illustrate diagrams for describing a method of displaying additional information about an object when the user input is obtained from an additional information area, the method being performed by the device, according to various embodiments.
Figure 10B:
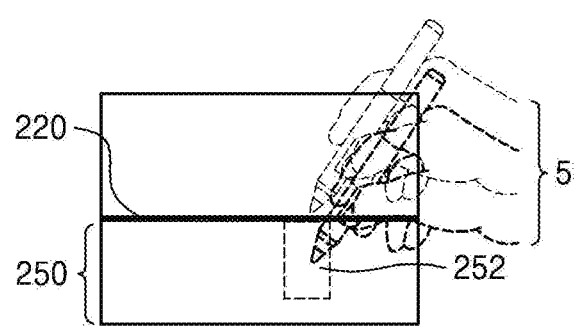
Figure 10C:
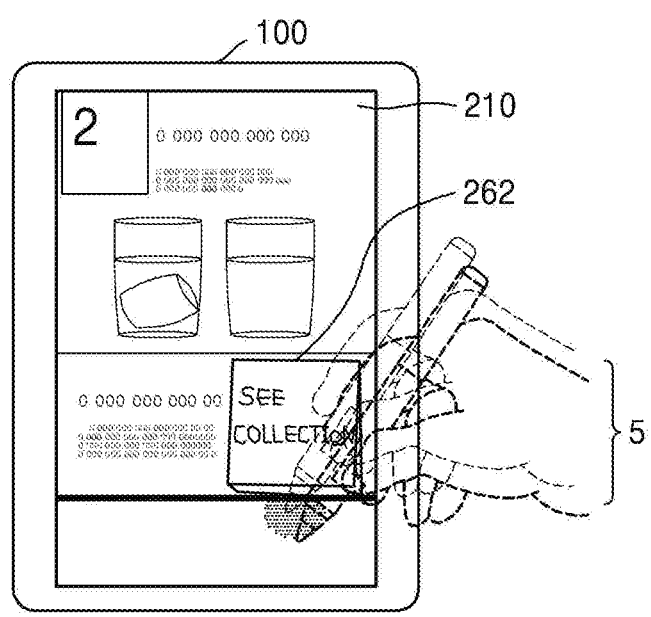

FIGS. 10A, 10B, and 10C illustrate diagrams for describing a method of displaying additional information about an object when the user input 5 is obtained from the additional information area 250, the method being performed by the device 100, according to various embodiments.

Referring to FIG. 10A, when the user input 5 is positioned at a bar unit a of the progress bar 220, the device 100 may detect a first object corresponding to the bar unit a.

Referring to FIG. 10B, the device 100 may obtain that the user input 5 is moved to the additional information area 250 and is positioned at a point below and at a distance Z from the bar unit a. The device 100 may divide the additional information area 250 into cells each having a preset size, and may determine a type of the additional information 260 to be displayed on the screen of the device 100 for each of the divided cells.

Referring to FIG. 10C, the device 100 may display, on the screen of the device 100, additional information 262 regarding the determined first object. For example, in the case where the first object is a picture image from among a plurality of picture images stored in a gallery application, the device 100 may display, as the additional information 262, information regarding a date, a time, or the like where the picture image was captured.

Figure 11:
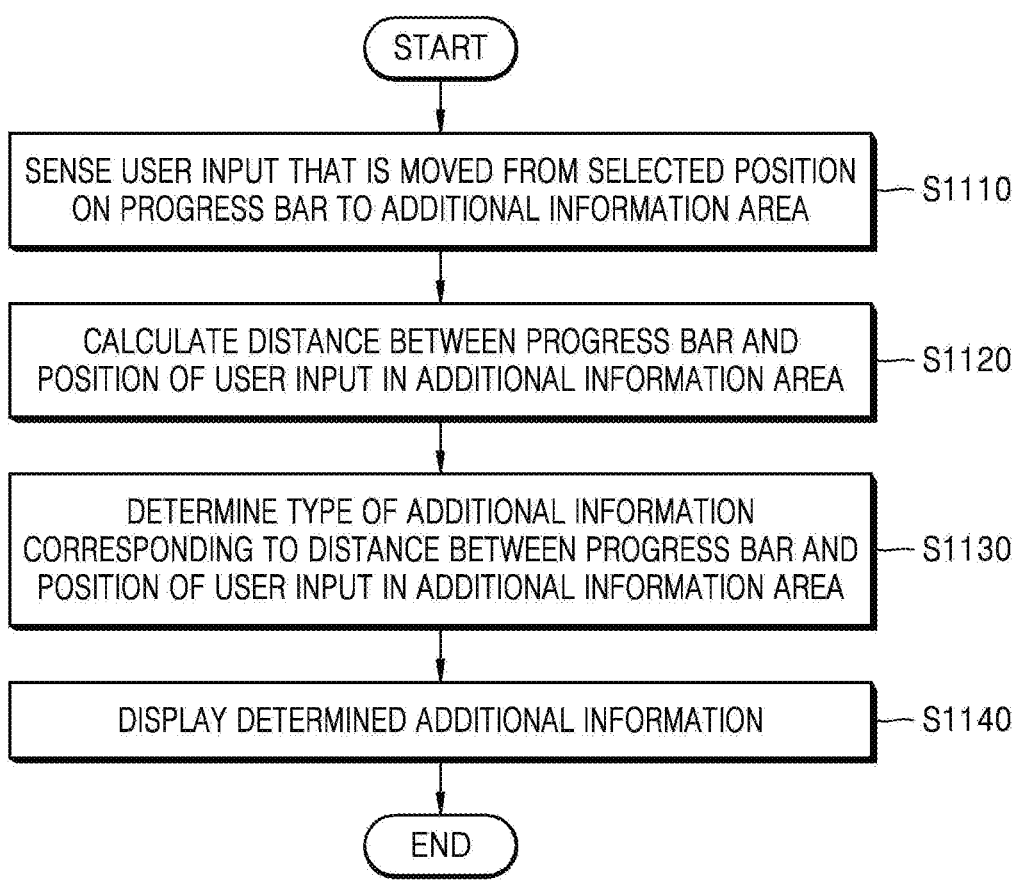
FIG. 11 is a diagram for describing a type of the additional information that is changed according to a distance between the progress bar and a position of the user input in the additional information area, according to an embodiment.

FIG. 11 is a flowchart for describing a method of changing a type of the additional information 260 according to a distance between the progress bar 220 and a position of the user input 5 in the additional information area 250, the method being performed by the device 100, according to an embodiment.

In operation 1110, the device 100 senses a user input moved to the additional information area 250 from a selected position on the progress bar 220 providing search information regarding a plurality of objects that are displayed according to an order.

Operation 1110 may correspond to aforementioned operation 920 of FIG. 9.

In operation 1120, the device 100 calculates a distance between the progress bar 220 and a position of the user input 5 in the additional information area 250.

In operation 1130, the device 100 determines a type of additional information corresponding to the distance between the progress bar 220 and the position of the user input 5 in the additional information area 250.

In operation 1140, the device 100 displays the additional information determined based on the position of the user input 5 in the additional information area 250.

Operation 1140 may correspond to aforementioned operation 930 of FIG. 9.

Figure 14:
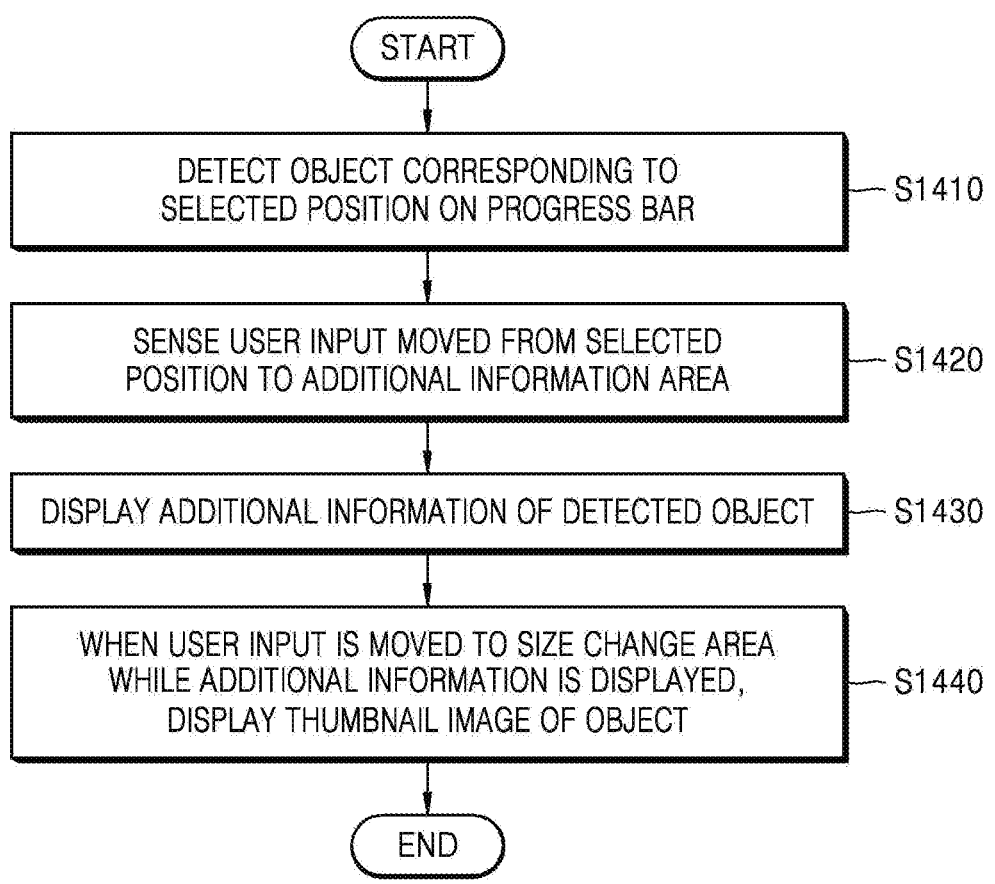
FIG. 14 is a flowchart for describing a method of displaying both the thumbnail image and the additional information of an object, the method being performed by the device, according to an embodiment.

FIG. 14 is a flowchart for describing a method of displaying both the thumbnail image 240 and the additional information 260 of an object, the method being performed by the device 100, according to an embodiment.

In operation 1410, the device 100 detects an object corresponding to a selected position on the progress bar 220 providing search information regarding a plurality of objects that are displayed according to an order. When the user input 5 is obtained on the progress bar 220, the device 100 may detect the object 210 corresponding to a bar unit at a position from which the user input 5 is obtained.

Operation 1410 may correspond to aforementioned operation 910 of FIG. 9.

In operation 1420, the device 100 obtains the user input 5 moved from the selected position to the additional information area 250. In this regard, the device 100 may obtain a touch input, a drag input, a hovering input, or the like as the user input 5. The device 100 may set an area within a second distance in a downward direction from the progress bar 220 to be the additional information area 250.

Operation 1420 may correspond to aforementioned operation 920 of FIG. 9.

In operation 1430, the device 100 displays the additional information of the detected object. For example, when the user input 5 is input to the additional information area 250, the device 100 may display the additional information 262 of the first object corresponding to the position X selected by the user.

Operation 1430 may correspond to aforementioned operation 930 of FIG. 9.

In operation 1440, when the user input 5 is moved to the size change area 230 while the additional information 262 of the first object is being displayed, the device 100 displays the thumbnail image 240 of the first object.

The device 100 may set an area within a first distance in an upward direction from the progress bar 220 to be the additional information area 250. When the user input 5 is input to the size change area 230, the thumbnail image 240 and the additional information 262 of the first object may be displayed together, wherein a size of the thumbnail image 240 corresponds to a position of the user input 5 in the size change area 230. However, this example is an embodiment, and the method of displaying both the additional information 260 and the thumbnail image 240 may vary according to setting.

Figure 15:
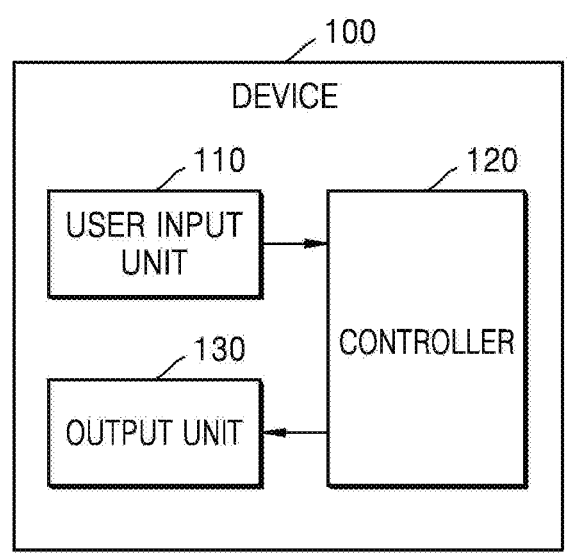
FIGS. 15 and 16 are block diagrams of the device that displays an object, according to an embodiment.
Figure 16:
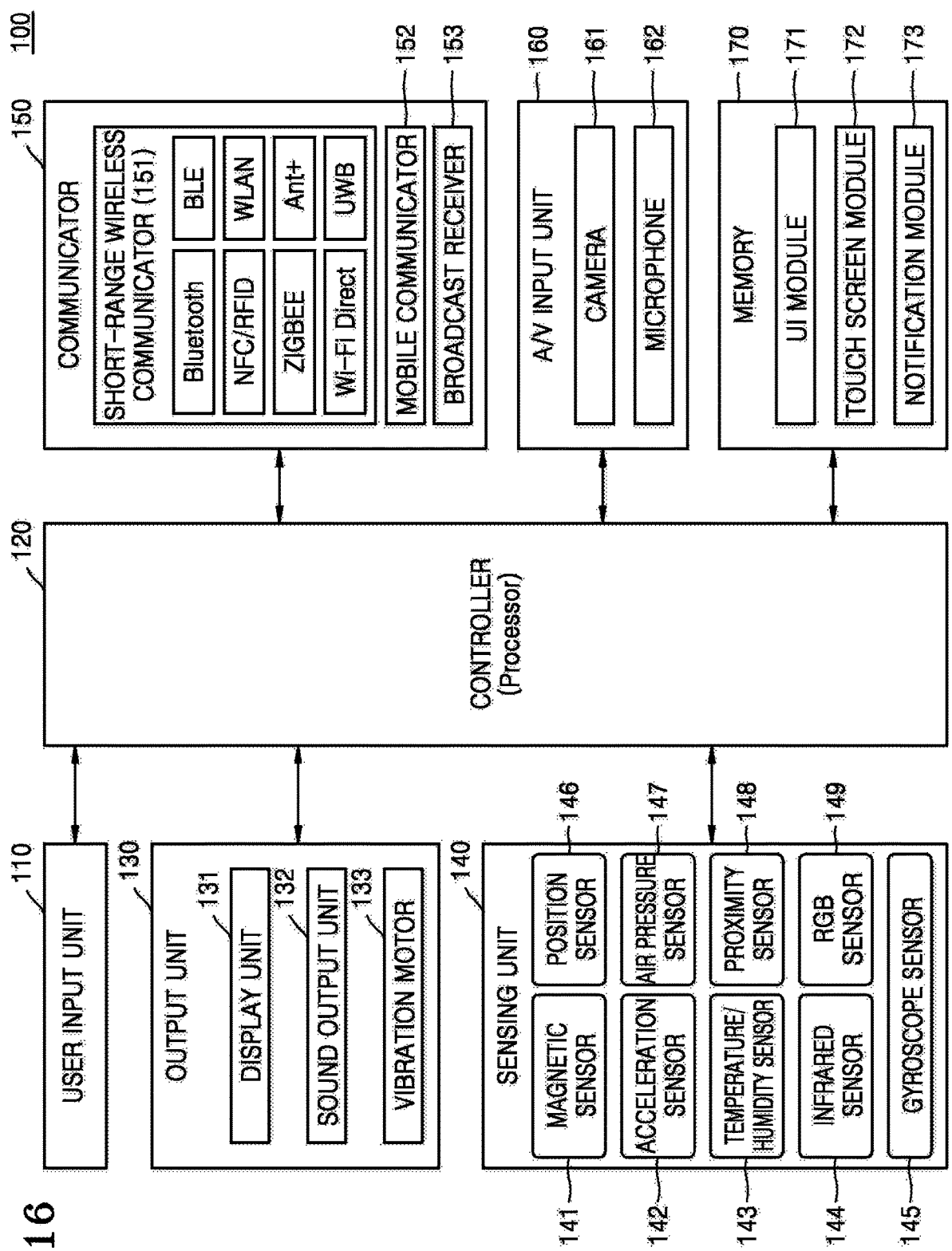

FIGS. 15 and 16 are block diagrams of the device 100 that displays an object, according to an embodiment. The device 100 illustrated in FIGS. 15 and 16 may include a user input unit 110, a controller 120, and an output unit 130. However, not all shown elements are necessary elements. That is, the device 100 may be embodied with more elements than the shown elements or may be embodied with fewer elements than the shown elements.

For example, as illustrated in FIG. 16, the device 100 according to the present embodiment may further include a sensing unit 140, a communicator 150, an audio/video (A/V) input unit 160, and a memory 170, in addition to the user input unit 110, the controller 120, and the output unit 130.

Hereinafter, the elements are sequentially described below.

The user input unit 110 refers to a unit through which a user inputs data to control an object (e.g., the object 210) displayed on the device 100. For example, the device 100 may include, but is not limited to, a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch.

The user input unit 110 may receive a user input for displaying the progress bar 220. For example, when the user input unit 110 obtains a hovering input for at least preset period of time, the user input unit 110 may display the progress bar 220. However, this is merely an embodiment, and when the user input unit 110 obtains a touch input or a drag input according to setting, the user input unit 110 may display the progress bar 220.

The user input unit 110 may obtain a user input of selecting a specific position on the progress bar 220. An object from among a plurality of objects that are displayable according to an order may be selected according to the user input of selecting the specific position on the progress bar 220.

The user input unit 110 may obtain a user input of editing, managing, and processing search information regarding an object in an area within a preset distance range from the progress bar 220. For example, the user input unit 110 may obtain a user input of changing a size of the thumbnail image 240 displayed in the size change area 230 that is an area within a first distance in an upward direction from the progress bar 220. According to another embodiment, the user input unit 110 may obtain a user input of determining a type of additional information regarding an object (e.g., the object 210) to be displayed in the additional information area 250 that is an area within a second distance in a downward direction from the progress bar 220, and displaying additional information having the determined type.

The controller 120 generally controls all operations of the device 100. For example, the controller 120 may control the user input unit 110, the output unit 130, the sensing unit 140, the communicator 150, and the A/V input unit 160 by executing programs stored in the memory 170.

The controller 120 may detect an object corresponding to a specific position on the progress bar 220 which is selected by the user. In addition, the controller 120 may detect the thumbnail image 240 of the detected object. The controller 120 may determine a size of the thumbnail image 240 of the object, based on a distance between the progress bar 220 and a position of the user input in the size change area 230.

In addition, when the position of the obtained user input is changed in one direction along the progress bar 220, the controller 120 may detect a thumbnail image of an object corresponding to the changed position. In this regard, the controller 120 may determine a size of the detected thumbnail image, based on a distance between the changed position and the progress bar 220.

When the position of the user input exits the size change area 230, the controller 120 may delete the displayed thumbnail image 240.

The controller 120 may detect the additional information 260 regarding the object corresponding to the specific position on the progress bar 220 which is selected by the user. In addition, the controller 120 may determine a type of displayed additional information 260 of the object, based on a distance between the progress bar 220 and a position of the user input in the additional information area 250.

In addition, when the position of the obtained user input is changed in one direction along the progress bar 220 in the additional information area 250, the controller 120 may detect the additional information 260 of an object corresponding to the changed position. In this regard, a type of the additional information 260 regarding the detected object may be determined based on a distance between the changed position and the progress bar 220.

When the position of the user input exits the additional information area 250, the controller 120 may delete the displayed additional information 260 regarding the object.

The controller 120 may display both the thumbnail image 240 and the additional information 260 regarding the selected object according to a position from which a user input is obtained. Descriptions regarding a user input with respect to a case where the thumbnail image 240 and the additional information 260 are displayed together are equal to those described with reference to FIGS. 7 and 14.

The output unit 130 may output an audio signal, a video signal, or a vibration signal, and may include a display unit 131, a sound output unit 132, a vibration motor 133, or the like.

The display unit 131 displays and outputs information processed in the device 100. For example, when an application is executed, the display unit 131 may display at least one object including information related to executing the application. In addition, the display unit 131 may display the progress bar 220 providing search information regarding a plurality of objects (e.g., the objects 210). For example, when a hovering input is obtained for at least preset period of time through the user input unit 110, the display unit 131 may display the progress bar 220.

The display unit 131 displays the thumbnail image 240 of the object according to the size determined based on the position of the user input in the size change area 230. In addition, when the position of the user input 5 in the size change area 230 is changed in one direction along the progress bar 220, the display unit 131 may display the thumbnail image 240 having the determined size and regarding the object corresponding to the changed position.

While the thumbnail image 240 is being displayed, when the user input 5 that is moved to the additional information area 250 is sensed through the user input unit 110, the display unit 131 may display additional information of an object indicated by the thumbnail image 240.

The display unit 131 may display the additional information 260 of a selected object selected on the progress bar 220. When the position of the user input 5 in the additional information area 250 is changed in one direction along the progress bar 220, the display unit 131 according to an embodiment may display the additional information 260 of an object corresponding to the changed position.

While the additional information 260 is being displayed, when the user input is moved to the size change area 230, the display unit 131 may display both the additional information 260 of a detected object and the thumbnail image 240 of the detected object.

When the display unit 131 and a touch pad form a mutual layer structure and then are formed as a touch screen, the display unit 131 may be used as both an output device and input device. The display unit 131 may include at least one of liquid crystal display (LCD), a thin film transistor-liquid crystal display (TFT-LCD), an organic light-emitting diode (OLED) display, a flexible display, a three-dimensional (3D) display, and an electrophoretic display. According to a type of the device 100, the device 100 may include at least two display units 131. Here, the at least two display units 131 may be disposed to face each other by using a hinge.

The sound output unit 132 may output audio data that is received from the communicator 150 or is stored in the memory 170. The sound output unit 132 may also output a sound signal (e.g., a call signal receiving sound, a message receiving sound, a notifying sound, or the like) related to capabilities performed by the device 100. The sound output unit 132 may include a speaker, a buzzer, or the like.

The vibration motor 133 may output a vibration signal. For example, the vibration motor 133 may output the vibration signal that corresponds to an output of the audio data (e.g., the call signal receiving sound, the message receiving sound, or the like) or video data. When a touch is input to the touch screen, the vibration motor 133 may output a vibration signal.

The sensing unit 140 may sense a state of the device 100 or a status around the device 100 and may transfer sensed information to the controller 120.

The sensing unit 140 may include, but is not limited to, at least one of a magnetic sensor 141, an acceleration sensor 142, a temperature/humidity sensor 143, an infrared sensor 144, a gyroscope sensor 145, a position sensor (e.g., a global positioning system (GPS)) 146, an air pressure sensor 147, a proximity sensor 148, and an RGB sensor (i.e., a luminance sensor) 149. Functions of the sensors may be intuitionally deduced by one of ordinary skill in the art by referring to names of the sensors, and thus, detailed descriptions thereof are omitted here.

The sensing unit 140 may sense an operation by the user. For example, the sensing unit 140 may sense the user input 5 remaining at a specific position on the progress bar 220. The sensing unit 140 may sense a change in a position of the user input 5 or a remaining period of time of the user input 5 in the size change area 230 and the additional information area 250.

The controller 120 may control operations of the device 100, based on operations sensed by the sensing unit 140. The operations of the device 100 corresponding to the operations sensed by the sensing unit 140 are equal to those in the embodiments.

The communicator 150 may include one or more elements allowing communication between the device 100 and an external device or the device 100 and a server. For example, the communicator 150 may include a short-range wireless communicator 151, a mobile communicator 152, and a broadcast receiver 153.

The short-range wireless communicator 151 may include, but is not limited to, a Bluetooth communicator, a Bluetooth Low Energy (BLE) communicator, a near field communication (NFC) unit, a WLAN (Wi-Fi) communicator, a Zig-Bee communicator, an infrared Data Association (IrDA) communicator, a Wi-Fi Direct (WFD) communicator, a ultra wideband (UWB) communicator, and an Ant+ communicator.

The mobile communicator 152 exchanges a wireless signal with at least one of a base station, an external terminal, and a server on a mobile communication network. The wireless signal may include various types of data according to communication of a sound call signal, a video call signal, or a text/multimedia message.

The broadcast receiver 153 receives a broadcast signal and/or information related to a broadcast from the outside through a broadcast channel. The broadcast channel may include a satellite channel and a ground wave channel. In another embodiment, the device 100 may not include the broadcast receiver 153.

The A/V input unit 160 may receive an input of an audio signal or a video signal and may include a camera 161 and a microphone 162. The camera 161 may obtain an image frame such as a still image or a moving picture via an image sensor during a video call mode or an image-capturing mode. An image that is captured via the image sensor may be processed by the controller 120 or a separate image processing unit (not shown).

The image frame that is processed by the camera 161 may be stored in the memory 170 or may be transmitted to an external source via the communicator 150. According to a configuration of the device 100, two or more cameras 161 may be arranged.

The microphone 162 receives an input of an external sound signal and processes the received sound signal into electrical voice data. For example, the microphone 162 may receive a sound signal from an external device or a speaker. In order to remove noise that occurs while the sound signal is being externally input, the microphone 162 may use various noise removing algorithms.

The memory 170 may store a program for processing and controlling the controller 120, and may store a plurality of pieces of data (e.g., objects including information required in executing an application, and metadata regarding the objects) that are input to or output from the device 100.

The memory 170 may include a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The device 100 may run web storage or a cloud server that performs a storage function of the memory 170 on the Internet.

The programs stored in the memory 170 may be classified into a plurality of modules according to their functions, for example, into a user interface (UI) module 171, a touch screen module 172, a notification module 173, etc.

The UI module 171 may provide a specialized UI or graphical user interface (GUI) associated with the device 100 for each service. The touch screen module 172 may detect a user's touch gesture on the touch screen and transmit information related to the touch gesture to the controller 120. The touch screen module 172 according to the present embodiment may recognize and analyze a touch code.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The notification module 173 may generate a signal for notifying the user about an occurrence of an event in the device 100. Examples of the event that may occur in the device 100 include a call signal receiving event, a message receiving event, a user input obtainment event, a schedule notifying event, or the like. The notification module 173 may output an alarm signal in the form of a video signal via the display unit 131, an alarm signal in the form of an audio signal via the sound output unit 132, or an alarm signal in the form of a vibration signal via the vibration motor 133.

The methods according to the embodiments can be embodied as programmed commands to be executed in various computer means, and then can be recorded to a non-transitory computer-readable recording medium. The non-transitory computer readable recording medium may include one or more of the programmed commands, data files, data structures, or the like. The programmed commands recorded to the non-transitory computer-readable recording medium may be particularly designed or configured for the disclosure or may be well known to one of ordinary skill in the art. Examples of the non-transitory computer-readable recording medium include magnetic media including hard disks, magnetic tapes, and floppy disks, optical media including CD-ROMs, and DVDs, magneto-optical media including floptical disks, and a hardware apparatus designed to store and execute the programmed commands in read-only memory (ROM), random-access memory (RAM), flash memories, and the like. Examples of the programmed commands include not only machine code generated by a compiler but also include a high-level programming language to be executed in a computer by using an interpreter.

The invention claimed is:

1. A method of displaying an object on a device, the method comprising:

identifying an object corresponding to a selected position on a progress bar providing search information regarding a plurality of objects that are displayed according to an order;

obtaining a user input moved from the selected position to an additional information area;

identifying a type of content for the object based on a position of the user input on the additional information area divided into cells, wherein each cell corresponds to a different type of the content for the object; and displaying additional information including the identified type of the content in response to the position of the user input on the additional information area.

2. The method of claim 1, wherein the identifying of the type of the content comprises identifying the type of the content of the additional information, based on a distance between the progress bar and the position of the user input on the additional information area.

3. The method of claim 1, further comprising, when the position of the user input in the additional information area is changed in one direction along the progress bar, displaying additional information of an object corresponding to the changed position.

4. The method of claim 1, further comprising:

obtaining a user input moved from the selected position to a size change area; and displaying a thumbnail image of the object, the thumbnail image having a size determined based on a position of the user input in the size change area.

5. The method of claim 4, wherein the displaying of the thumbnail image of the object comprises determining the size of the thumbnail image of the object, according to a distance between the progress bar and the position of the user input in the size change area.

6. The method of claim 4, further comprising, when the position of the user input in the size change area is changed in one direction along the progress bar, displaying a thumbnail image of an object corresponding to the changed position, wherein the thumbnail image has the determined size.

7. The method of claim 1, further comprising, when the user input is moved to the additional information area while a thumbnail image of the object is being displayed, displaying additional information of the object indicated by the thumbnail image.

8. The method of claim 7, wherein the additional information area is distinct from the progress bar and distinct from the thumbnail image.

9. A non-transitory computer-readable recording medium having recorded thereon a program for executing the method of claim 1.

10. A device that displays an object, the device comprising:

a display configured to obtain a user input moved from a selected position to an additional information area, the selected position being on a progress bar providing search information regarding a plurality of objects that are displayed according to an order; and at least one processor configured to:

identify an object corresponding to the selected position on the progress bar, and identify a type of content for the object based on a position of the user input on the additional information area divided into cells, wherein each cell corresponds to a different type of the content for the object, and wherein the display is further configured to display additional information related to the object in response to the position of the user input on the additional information area.

11. The device of claim 10, wherein the at least one processor is further configured to identify the type of the content of the additional information, based on a distance between the progress bar and the position of the user input on the additional information area.

12. The device of claim 10, wherein, when the position of the user input in the additional information area is changed in one direction along the progress bar, the display is further configured to display additional information of an object corresponding to the changed position.

13. The device of claim 10, wherein the at least one processor is further configured to obtain a user input moved from the selected position to a size change area and display a thumbnail image of the object, the thumbnail image having a size determined based on a position of the user input in the size change area.

14. The device of claim 13, wherein the at least one processor is further configured to determine the size of the thumbnail image of the object, according to a distance between the progress bar and the position of the user input in the size change area.

15. The device of claim 13,
wherein the at least one processor is further configured to, when the position of the user input in the size change area is changed in one direction along the progress bar, display a thumbnail image of an object corresponding to the changed position, and
wherein the thumbnail image has the determined size.

16. The device of claim 10, wherein the at least one processor is further configured to, when the user input is moved to the additional information area while a thumbnail image of the object is being displayed, displaying additional information of the object indicated by the thumbnail image.

17. The device of claim 16, wherein the additional information area is distinct from the progress bar and distinct from the thumbnail image.

* * * * *